United States Patent [19]

Suboh

[11] Patent Number: 5,619,707

[45] Date of Patent: Apr. 8, 1997

[54] VIDEO SUBSYSTEM POWER MANAGEMENT APPARATUS AND METHOD

[75] Inventor: Abdel H. Suboh, Houston, Tex.

[73] Assignee: Compaq Computer Corporation, Houston, Tex.

[21] Appl. No.: 630,540

[22] Filed: Apr. 10, 1996

Related U.S. Application Data

[63] Continuation of Ser. No. 191,311, Jan. 27, 1994, Pat. No. 5,524,249.

[51] Int. Cl.$^6$ .................................................. G06F 13/00
[52] U.S. Cl. .................................................. 395/750
[58] Field of Search ........................ 395/750; 364/707

[56] References Cited

U.S. PATENT DOCUMENTS 5,167,024  11/1992  Smith et al. .......................... 395/375
5,321,806  6/1994  Meinerth et al. ..................... 395/162
5,402,148  3/1995  Post et al. ............................ 345/132
5,408,639  4/1995  Gulick et al. ........................ 395/550

Primary Examiner—Jack B. Harvey
Assistant Examiner—John Travis
Attorney, Agent, or Firm—Vinson & Elkins L.L.P.

[57] ABSTRACT

Power is conserved in a video subsystem by inactivating a pixel clock (PCLK) and reducing frequency of a memory clock (MCLK) responsive to an indication of user inactivity. The inactivation of PCLK reduces the power consumed in the RAMDAC, frame buffer, phase lock loop (PLL) clock circuit, and to a smaller extent, the video controller. Reducing the frequency of MCLK conserves power in the video controller and the PLL, while maintaining the integrity of the data in the frame buffer. Significant power savings can be accomplished with minimal BIOS or video controller programming and minimal transfer of state information prior to power-down.

21 Claims, 3 Drawing Sheets

VIDEO SUBSYSTEM POWER MANAGEMENT APPARATUS AND METHOD

RELATED APPLICATIONS

This application is a continuation application of U.S. patent application No. 08/191,311, filed Jan. 27, 1994, U.S. Pat. No. 5,524,249, and entitled "Video Subsystem Power Management Apparatus and Method,".

TECHNICAL FIELD OF THE INVENTION

This invention relates in general to computers, and more particularly to a method and apparatus for performing power management in a video subsystem of a computer.

BACKGROUND OF THE INVENTION

Over the last several years, conservation of power in computer systems, particularly personal computers, has become an important issue. Initially, power consumption was a major factor in portable computers where the overall power consumption of the computer directly affects the duration of its operation under battery power. By efficiently controlling power consumption, particularly during periods of inactivity, the battery life of a portable computer can be greatly extended.

To conserve power during periods of inactivity, portable computers take steps to reduce power to various components. Power conservation steps vary between vendors; in general, power or clock cycles are disabled in various subsystems, including the video subsystem, and the speed of the microprocessor and the spin rate of the hard disk may be reduced. For the power management techniques to be transparent to the user, the computer must be able to recover from a power management shut-down in precisely the state which would exist in the absence of power management techniques. The video subsystem contains a frame buffer whose integrity cannot be ensured once refresh cycles are disabled, which will occur if all clocks are disabled on the video subsystem or if the power to the video subsystem is disabled. To prevent frame buffer data losses due to clock disablement, some portable computers couple an additional clock, generated outside of the video subsystem to the frame buffer to perform the frame buffer refresh. This solution has several problems, particularly with desktop systems. First, system design is complicated because of the additional circuitry for enabling the clock upon transition to a power conservation mode. Second, it requires hardware dependence between the video subsystem and the system motherboard.

Prior to a power shut-down to the video subsystem, the contents of the frame buffer, typically one to two megabytes, must be stored to disk (or other non-volatile memory) prior to initiation of the power management techniques. Additionally, state information for the video controller must be saved to disk prior to disabling the video subsystem. Consequently, upon resuming normal operation in response to some activity (such as a keystroke), the stored data must be transferred from the non-volatile memory to the video subsystem to restore the state information. The time delay incurred as a consequence of the power management techniques regarding the video subsystem can be significant and, hence, frustrating to the user. Further, saving the frame buffer and state information complicates the design of the computer system.

More recently, the issue of power reduction has become more important with desktop systems, as well as portable computers. While desktop systems do not use battery power and, hence, power management is not needed for enhanced operation of the system, the greatly increased use of desktop computers has resulted in an overall increase in power consumption. Recognizing the need for energy conservation, the federal government has started the "Energy Star" program to recognize computers which meet certain energy consumption guidelines. Particularly with desktop units, it is important to perform the energy management measures without affecting the performance of the system since, aside from environmental issues, the energy management systems do not have an offsetting benefit as they do in a portable computer.

Further, since video subsystems are often coupled to the system motherboard as a card on the system bus, it is desirable that the power management features of the video card are not dependent upon system board hardware, such as auxiliary clock circuits.

Therefore, a need has arisen to provide energy management in a video subsystem which can be easily implemented and does not significantly affect the performance of the computer, while still producing significant energy conservation.

SUMMARY OF THE INVENTION

The present invention reduces power in a video subsystem by generating signals to a display of a computer system to reduce power to the display, inactivating a pixel clock which coupled to a RAMDAC and decreasing the frequency of a memory clock for driving a video controller by a predetermined factor, thereby reducing the power consumed by the video controller.

The present invention provides significant advantages over the prior art. The inactivation of PCLK reduces the power consumed in the RAMDAC, frame buffer, phase lock loop (PLL) clock circuit, and to a smaller extent, the video controller. Reducing the frequency of MCLK conserves power in the video controller and the PLL, while maintaining the integrity of the data in the frame buffer. Significant power savings can be accomplished with minimal BIOS or video controller programming and minimal transfer of state information prior to power-down.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
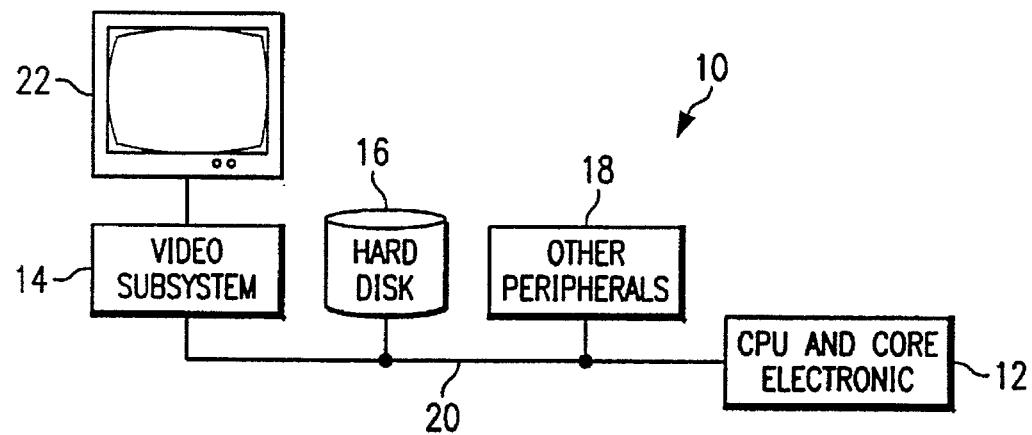
FIG. 1 illustrates a block diagram of a computer system with a video subsystem with power management circuitry.

FIG. 1 illustrates a block diagram of a general computer system 10. The computer system 10 comprises a CPU motherboard 12 coupled to a video subsystem 14, hard disk 16 and other peripherals, generally referenced at numeral 18, over bus 20. The video subsystem 14 is coupled to display 22. It should be noted that the block diagram of FIG. 1 presents a general architecture for a computer system. Many features formally coupled to the bus 20 have been incorporated into the system motherboard in present-day designs. The present invention, which concerns power management of the video subsystem 14, is effective for both video cards for connection to a bus and integrated video circuitry on the motherboard.

In personal computers which operate under the MICROSOFT DOS operating system, power management is generally controlled by the system BIOS (basic input/output system) on the CPU motherboard 12 which monitors activity on the keyboard, mouse and I/O ports to detect situations where the CPU is merely waiting for user input. When the system detects that there has been no user input for a predetermined interval of time, typically around 10 minutes, it executes a power management routine. The power management operations taken by the BIOS may vary depending upon the duration of inactivity. For example, the display 22 may be put in stand-by mode after 10 minutes of inactivity and turned off completely after 45 minutes of inactivity.

One form of power management with regard to the display 22 is the VESA monitor power management protocol. Displays which follow the VESA monitor power management protocol enter different states of power management based on the HSYNC and VSYNC signals output from the video subsystem 14. Table I outlines the VESA monitor power management states.

TABLE I

| VESA Monitor Power Management | | |
| --- | --- | --- |
| Mode | HSYNC | VSYNC |
| Normal | Active | Active |
| Standby | Inactive | Active |
| Suspend | Active | Inactive |
| Off | Inactive | Inactive |

In addition to enabling display power management responsive to control signals from the system's BIOS, the video subsystem 14 of the present invention also has power management capabilities, such that the power consumed by the video subsystem is greatly reduced with only minimal transition time between reduced-power and normal operation states. Further, the number of operations needed to reduce power are relatively few.

Figure 2:
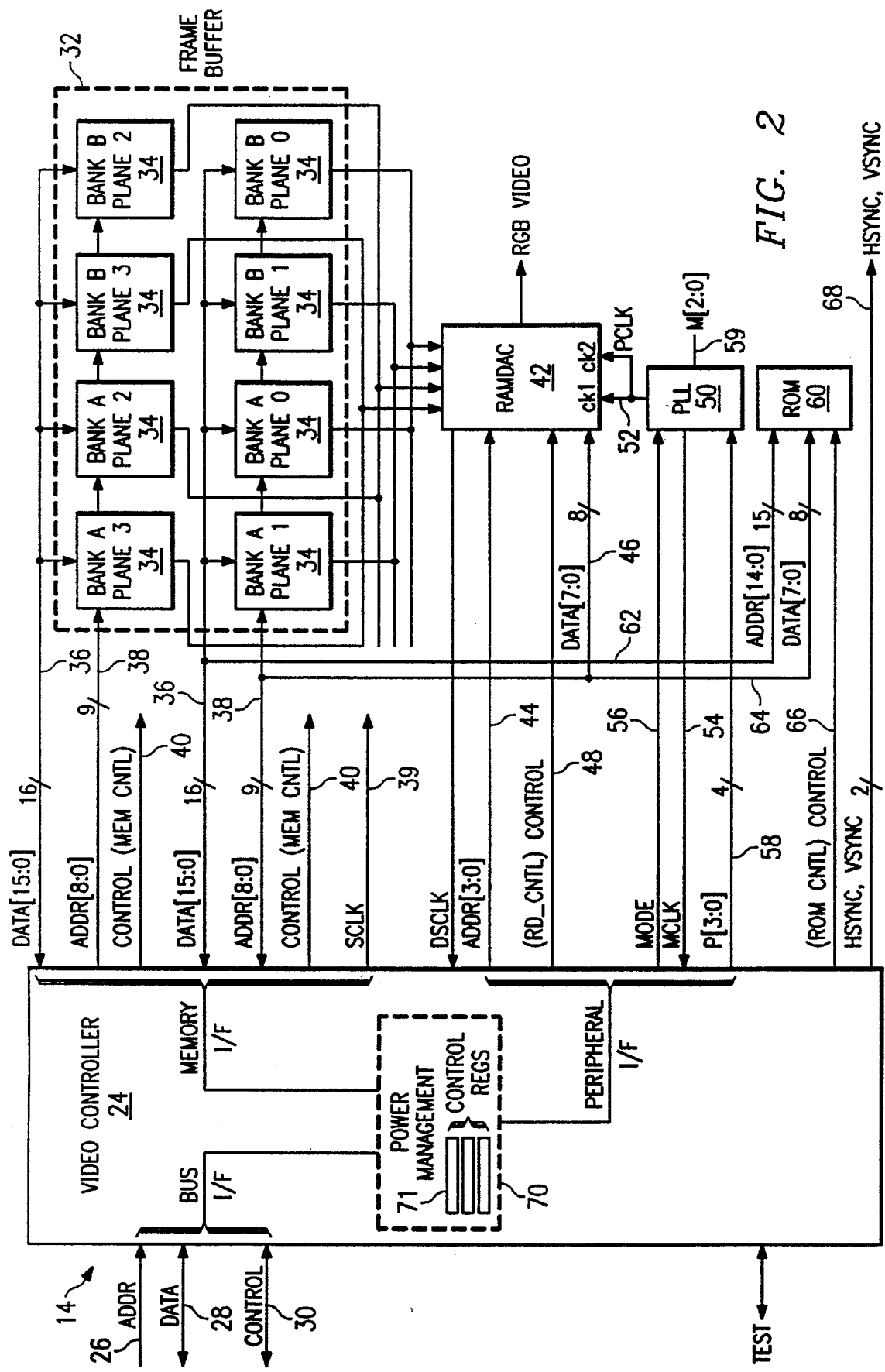
FIG. 2 illustrates a block diagram of the video subsystem of claim 1.

FIG. 2 illustrates a block diagram of the video subsystem 14 of the present invention. In order to more clearly illustrate the power management features, signals which are unnecessary to describe the invention have been condensed or eliminated. Control of the video subsystem is provided by video controller 24. The video controller is coupled to the bus 20 through ADDR lines 26, DATA lines 28 and CONTROL lines 30. The video controller 24 is also coupled to a frame buffer 32 comprising a plurality of VRAM circuits 34 organized in two banks (bank A and bank B ). A VRAM comprises a DRAM whose output is directed to a shift register. The video controller 24 is coupled to the frame buffer 32 via DATA lines 36, ADDR lines 38, SCLK 39 and CONTROL lines 40. The output of the frame buffer 32 is coupled to a RAMDAC 42 which produces the RGB video output to display 22. The RAMDAC 42 is coupled to the video controller 24 via ADDP, lines 44, DATA lines 46, DSCLK 47 and CONTROL lines 48. A phase lock loop circuit 50 (or other clock circuit) outputs a pixel clock (PCLK) 52 to the RAMDAC 42. The PLL 50 also generates a memory clock (MCLK) 54, which is output from the PLL 50 to the video controller 24. The PCLK controls the output of pixels from the RAMDAC 42 to the display 22, while the MCLK controls the video controller 24. DSCLK SCLK are generated from PCLK. DSCLK and SCLK are generally the same frequency. DSCLK can be the same frequency as PCLK or can be divided down.

The video controller 24 controls the PLL 50 using the MODE lines 56, P lines 58 and M lines 59. When used as a card, rather than integrated on the system motherboard, a ROM 60 performs initiation functions not related to power management. The ROM 60 is coupled to the video controller 24 through ADDR lines 62, DATA lines 64 and CONTROL lines 66. The video controller 24 also outputs HSYNC and VSYNC signals to the display 22 on lines 68.

Video controller 24 includes power management circuitry 70 which implements power management procedures to reduce the energy consumed by the video subsystem, and in particular, the display 22, the frame buffer 32, RAMDAC 42, PLL 50 and the video controller 24. Power management in the video subsystem 14 is performed in response to inactivity on the keyboard, mouse and I/O ports. After a certain period of inactivity, the BIOS executes a power management subroutine which, through video controller 24, results in reduced power consumption of the video subsystem 14 and display 22. While the power management circuitry 70 is shown as a block within video controller 24, it should be noted that the circuitry comprises mainly configuration registers 71 (or other memory device) within the video controller 24 which are used by various state machines within the video controller 24 to initiate the signals for reducing power in the video subsystem 14. Exemplary registers and functions are set forth below.

In the preferred embodiment, the video controller uses a RAMDAC with a power-down mode, such as the Bt484 or Bt485 RAMDAC manufactured by BROOKTREE of San Diego, Calif. When a command bit (CR00) in the RAMDAC is a logical "1", the DACs and power to the RAM are turned off. The RAM retains its data in this mode. While in the power-down mode, the RAM may be accessed as long as the PCLK is running. The RAM automatically powers up when accessed and shuts down when the access is complete. The DACs output no current in this state, and the RAMDAC command registers may still be accessed. When in the power-down mode, the power consumption is reduced by about 85%.

In addition to the power-down, the preferred embodiment of the video subsystem 14 also provides further power reduction in the RAMDAC by disabling PCLK. In this enhanced power-reduction mode, power consumption is reduced by about 98%. While the RAM retains data, the data cannot be accessed until PCLK is reactivated.

Disabling PCLK also conserves some power in the video controller 24. Great power savings can be achieved by reducing the frequency of MCLK, since most of the state machines in the video controller 24 will normally be dependent; on MCLK. Since MCLK controls the rate at which the video controller 24 performs the refresh of the DRAM in the VRAMs 34, MCLK must be maintained to preserve the frame buffer data. In the preferred embodiment, MCLK is reduced in frequency to reduce power consumption in the video controller 24, resulting in a corresponding reduction in the refresh rate. In order to refresh the DRAMs properly, the refresh rate, which is set in the video controller 24, is increased to offset the reduction of MCLK frequency.

As described above, the PLL 50 generates both PCLK and MCLK. In the preferred embodiment, the frequency of the PCLK and MCLK signals is programmable in the PLL 50. To reduce the number of lines necessary to program the PLL, both serial and parallel modes are available. In parallel mode, the frequencies of MCLK and PCLK are determined by the values on the M lines 59 and P lines 58, respectively. (In the illustrated embodiment, the M lines 59 are set through jumpers on the video subsystem board.) Since only a limited number of frequencies may be enabled using 4-bit P lines 58 and 3-bit M lines, serial mode uses the P lines 58 to serially transfer data from the video controller 24 to the PLL 50 to program both PCLK and MCLK to frequencies not available, in parallel mode. By turning off PCLK and reducing the frequency of MCLK, the power consumed by the PLL is reduced. The operation of the PLL is described in greater detail in connection with FIG. 3.

By disabling PCLK, the shift clock SCLK 39, which controls the serial port of the VRAM, is also turned off. However, transfer cycles (transfer of data from the DRAM of the VRAMs 34 to the shift registers of the VRAMs 34) will continue. However, with a reduced-frequency MCLK, the transfer cycle frequency is also reduced because of the reduced speed of the video controller 24 which controls memory cycles in the frame buffer 32. Consequently, turning off PCLK and reducing the frequency of MCLK reduces power consumption by the frame buffer 32.

Figure 3:
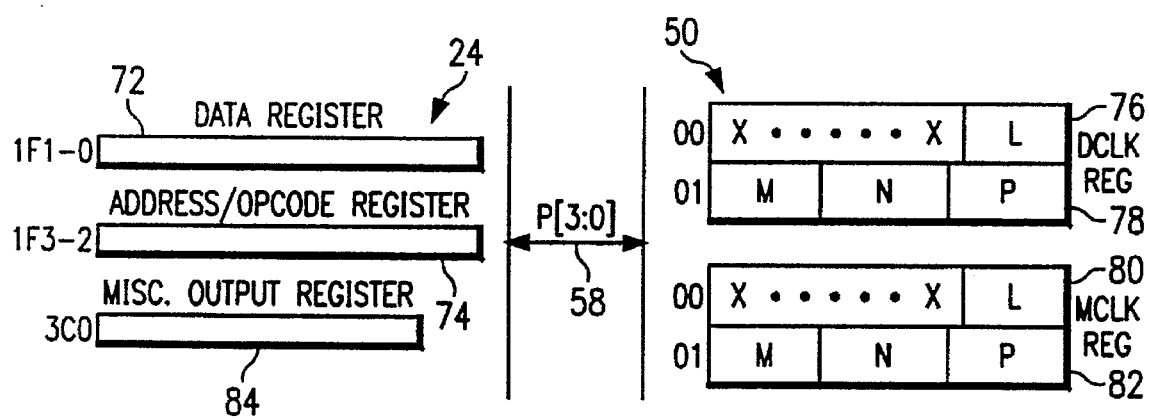
FIG. 3 illustrates a block diagram of the communication circuitry for transferring frequency parameters between the video controller and the PLL of FIG. 2.

FIG. 3 illustrates the communication between the video controller 24 and the PLL 50. The video register 24 uses to internal PLL serial interface registers, a data register 72 and an Address/Opcode Register 74 to communicate with the PLL 50. Upon writing an address to the Address Register 74, the video controller 24 sets the PLL 50 into serial mode, initiates a MicroWire serial transfer of opcode, address and data to the PLL registers. The PLL registers include two PCLK registers 76 and 78 and two MCLK registers 80 and 82. Bits 1:0 of the Address/Opcode Register 76 specify the address to which the contents of the Data Register 74 is written, as specified in Table II. To restore the PLL 50 to parallel mode, the Miscellaneous Output Register 84 of the video controller is read and then written back, which then initiates the proper control sequence for the mode switch. Bit 7 of the Address/Opcode Register indicates which mode (0=parallel, 1=serial) is current for the PLL 50.

TABLE II

Serial Interface Address Modes

| Bits 1:0 | Destination PLL Register |
|---|---|
| 00 | Lower PCLK register 76 |
| 01 | Upper PCLK register 78 |
| 10 | Lower MCLK register 80 |
| 11 | Upper MCLK register 82 |

In the illustrated embodiment, two writes are required to set PCLK or MCLK. First, the lower word is written, followed by a write of the upper word. Once the upper word is written, the PLL 50 will lock to the new frequency after a 5 ms delay. As shown in FIG. 3, both the PCLK and the MCLK registers have four fields, M, N, L, and P, which determine the desired frequency. The fields are defined in Table III.

TABLE III

PLL Frequency Operands

| Field | Definition |
|---|---|
| M[6:0] | Feedback Divisor |
| N[6:0] | Reference Divisor |
| P[1:0] | Post Scalar Divisor |
| L[3:0] | VCO Gain |

To compute the output frequency, the following equation may be used:

$$F_{OUT}=F_{REF}*2*(M+3)/[(N+2)*P]$$

where P, the VCO post-scalar divisor is defined in Table IV.

TABLE IV

Post Scalar Divisor

| P[1:0] | Divisor Value |
|---|---|
| 00 | 1 |
| 01 | 2 |
| 10 | 4 |
| 11 | 8 |

When a 0000h is written to the upper and lower PCLK registers 76 and 78, the PLL disables the PCLK signal. When a 0000h is written to the upper and lower MCLK registers 80 and 82, a minimum MCLK signal is output, since MCLK must be enabled in order to refresh the VRAMs 34. In the preferred embodiment, the minimum MCLK is a 1:8 reduction of the normal MCLK frequency.

In the preferred embodiment, the serial transfer is performed in the sub-megabyte range, and therefore, steps must be taken to ensure that back-to-back writes do not conflict. Thus, in back to back writes, the first data should be read back and compared to the written data. After the first data write is verified, the second write operation can take place. Other methods of communicating between the video controller 24 and the PLL 50 could also be used without the need for an intermittent verification step.

Figure 4:
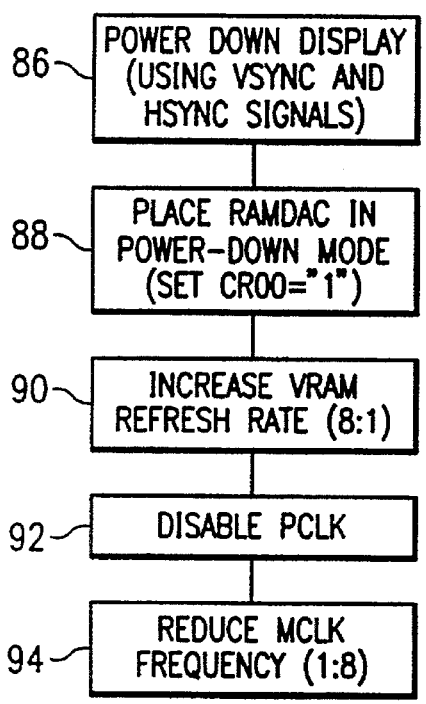
FIG. 4 illustrates a flow chart of the power-down sequence for the video subsystem.

The power-down routine mainly comprises the writing of control signals to various control registers, some of which may be standard VGA registers and some of which are specific to the implementation described herein. The writing may be performed by the BIOS through the bus interface of the video controller 24 or could be controlled by the video controller responsive to an inactivity signal from the BIOS. FIG. 4 illustrates a flow chart describing the power-down sequence.

In block 86, the display 22 is powered down, for example, by using the VESA power management protocol described above. To place the monitor in the standby state, VSYNC is driven inactive while keeping HSYNC active. A first technique for driving VSYNC inactive is to program the VGA VSYNC Start Register (3D5.10) to a value greater than the VGA Vertical Total Register (3D5.06). The VGA VSYNC Start Register and VGA Vertical Total Register are defined in the VGA specification and must exist for any VGA controller. Alternatively, the video control 24 could contain one or more registers with fields for controlling VSYNC. For example, in the preferred embodiment, a plurality of configuration registers are provided to perform various control functions within the controller 24. By writing a "1" to bit 5 of the Specific Configuration Register 2 (address 3CF.11), the VSYNC is driven inactive. Similarly, to put the monitor into off mode, both HSYNC and VSYNC are driven inactive, This can be performed by writing a "0" into bit 7 of the VGA mode control register (3d5.17). Alternatively, assuming that bit 4 of the Specific Configuration Register 2 control the HSYNC signal, a "1" could be written to bits 4 and 5 to render both VSYNC and HSYNC inactive.

In block 88, the RAMDAC is placed in power-down mode. For the BROOKTREE Bt484 or Bt485, this would be performed by writing a "1" to bit 0 at address 83C6 (which stores a "1" in CR00 of the RAMDAC 42), the DAC command register. In the illustrated embodiment, the BIOS can write to the RAMDAC 42 via the video controller 24, which interprets the address and passes the data to the RAMDAC 42. At this point, the DACs and power to the RAM are turned off, but the RAM and the internal registers still retain data and CPU reads and writes can occur with no loss of data.

In block 90, the VRAM refresh rate is increased to offset a later reduction in the MCLK frequency. In the illustrated embodiment, the refresh rate of the VRAM is programmably controlled in the video controller 24. Since the operation of the video controller 24 is responsive to the MCLK frequency, the refresh rate is increased by the same factor that the MCLK frequency will be decreased in a later step. Hence,, if the MCLK frequency is to be decreased by a factor of 8, the VRAM refresh rate will be increased by a factor of 8 from the normal rate in order to maintain the normal refresh rate of the VRAM. In the illustrated embodiment, bits 6 and 7 of the Specific Configuration Register 2 control the refresh rate, as shown in Table V.

TABLE V

Refresh Rate Codes

| Bit 7 | Bit 6 | Rate |
| --- | --- | --- |
| 0 | 0 | Normal |
| 0 | 1 | 2*Normal |
| 1 | 0 | 4*Normal |
| 1 | 1 | 8*Normal |

In the preferred embodiment, the refresh rate is increased by a factor of 8. It should be noted that if the refresh rate is controlled directly through the bus interface, rather than through the video controller 32, it may, or may not, be necessary to increase the refresh rate at this point. It is necessary to increase the refresh rate only if the later reduction in the MCLK frequency will affect the proper refresh rate of the DRAMs in the VRAM 34.

Figure 5:
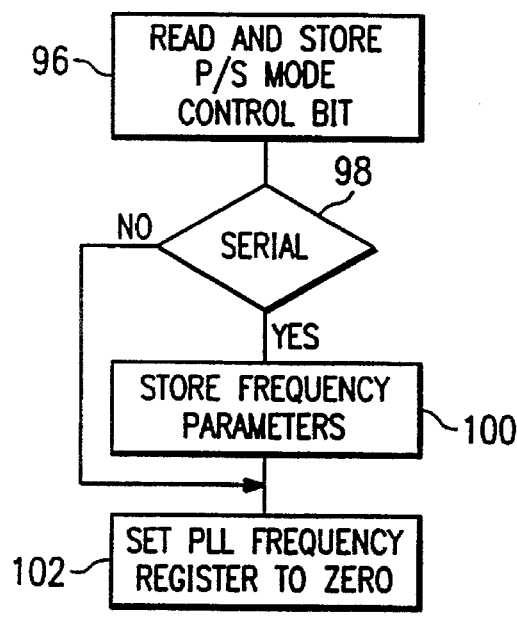
FIG. 5 illustrates a flow chart detailing the disabling of PCLK in the PLL.

In block 92, PCLK is disabled. This step is discussed in greater detail inconnection with FIG. 5. In block 96 of FIG. 5, the parallel/serial mode (bit 7 of the Address/Opcode register 74) is read and stored. If the BIOS is performing the read of the Address/Opcode register 74, then the bit would be stored in the main memory of the CPU motherboard 12 or in non-volatile memory. If the controller was performing the power-down sequence independent of the BIOS, the parallel/serial mode control bit could be stored in an internal register of the video controller 24.

In decision block 98, it is determined whether the PLL 50 is presently in serial mode or parallel mode. If the PLL 50 is in serial mode, then the PCLK frequency parameters M, N and P, are read from the serial interface Data Register (1F1-1F0) and stored in block 100. After the frequency parameters are stored (or the PLL 50 was in a parallel mode in decision block 98), PCLK is disabled. In the illustrated embodiment, this is performed by writing a "0" to the Data Register 72 and writing a value of "0001h" to the Address/Opcode register 74.

Returning to the flow chart of FIG. 4, the MCLK frequency is reduced by a predetermined factor (by a factor of 8 in the preferred embodiment) in block 94. In the illustrated embodiment, MCLK is statically selectable through jumpers and, therefore, there is no need to save the current MCLK before performing the reduction of frequency. However, if MCLK were dynamically programmable through the video controller 24, the frequency parameters would need to be saved using a method similarly to that shown in connection with FIG. 5. To slow the MCLK frequency by a default factor of 8, a "0" is written into the Data Register 72 and a value of "0003h" is written into the Address/Opcode Register 74.

Figure 6:
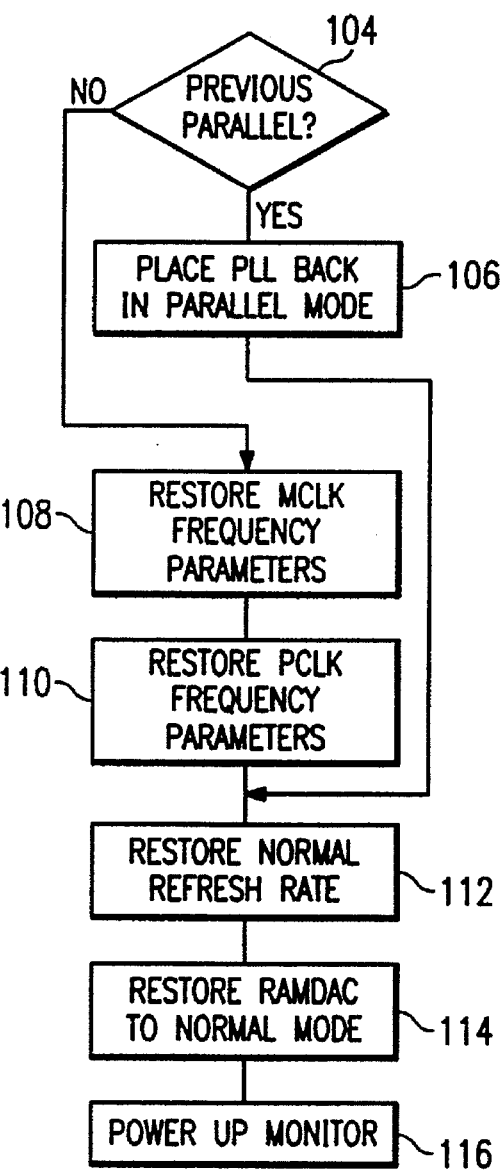
FIG. 6 illustrates a flow chart describing a return from the power-down state to normal operation.

The flow chart of FIG. 6 illustrates the power-up sequence for restoring the computer system 10 to normal video operation after user activity is detected in block 104, the previous state of the PLL is detected from the parallel/serial mode control bit, which was previously saved in connection with block 96. If the previous mode for the PLL was parallel mode, then the PLL is placed back in parallel mode by reading and writing back the Miscellaneous Output Register (3C2), as described above. This will place the PLL back in parallel mode and restore PCLK and MCLK. If, in decision block 104, the previous state was serial; then the MCLK frequency parameters are restored in block 108. As described above, restoration of the MCLK frequency parameters requires two writes to the PLL, the first write to register 80 and the second write to register 82. Hence, the L parameter is written to the serial data register and the value of "0002h" is written to the Address/Opcode register 74 to restore the data to register 80. The value in register 80 is read back and compared to the previously saved value to verify the write operation to the PLL 50. Once verified, the previously stored M, N and P parameters are written to the data register and the address of "0003h" is written to the Address/Opcode register. Once again, the write operation is verified by reading the data back from the PLL 50 and comparing it with the stored data.

In block 110, the PCLK frequency parameters are restored to the PLL 50, using the same procedure as described in connection with restoration of the MCLK frequency parameters. Once MCLK and PCLK are restored, the video controller 24 and the PLL 50 are fully powered to their normal state. Additionally, the RAMDAC 42 is partially powered to allow access to its registers.

In block 112, the refresh rate is restored to its normal rate. As shown in Table V, the normal refresh rate is restored by writing "00" to bits 7:6 of the Specific Configuration Register 2.

In block 114, the RAMDAC is restored to normal mode by writing a "0" to bit 0 at address 83C6, the DAC command register. In block 116, the monitor is powered-up from a suspend state by either programming the VGA VSYNC start register (3D5.10) to a value less than the VGA vertical total register (3D5.06) or, alternatively, using bit 5 of the Specific Configuration Register as discussed in connection with block 86 of FIG. 4, by writing a "0" to bit 5, the VSYNC signal is made active. To power-up from an off state, both VSYNC and HSYNC can be enabled by either writing a "1" to bit 7 of the VGA mode control register or, using the alternative embodiment, by writing a "0" to bits 4 and 5 of the Specific Configuration Register 2.

The present invention provides significant advantages over the prior art. The inactivation of PCLK reduces the power consumed in the RAMDAC 42, frame buffer 32, phase lock loop (PLL) clock circuit 50, and to a smaller extent, the video controller 24. Reducing the frequency of MCLK conserves power in the video controller 24 and the PLL 50, while maintaining the integrity of the data in the frame buffer 32. Significant power savings can be accomplished with minimal BIOS or video controller programming and minimal transfer of state information prior to power-down. It should be noted that power will be conserved in the frame buffer 32 using the preferred embodiment described above, even if DRAMs are used in place of VRAMs in the frame buffer 32.

In the description provided above, specific addresses and register formats have been given for the configuration registers in the power-up circuitry 70. These addresses and configurations are exemplary only, and other configurations and formats could be used for controlling the various devices in the video subsystem 14. Also, as described above, the control for performing the power-up and power-down of the various devices of the video subsystem could be enabled either through the BIOS, a video driver, or directly from the video controller.

Although the Detailed Description of the invention has been directed to certain exemplary embodiments, various modifications of these embodiments, as well as alternative embodiments, will be suggested to those skilled in the art.

The invention encompasses any modifications or alternative embodiments that fall within the scope of the claims.

What is claimed is:

1. A method of reducing power consumption in a computer system, comprising the steps of:
   generating signals to a display of the computer system to reduce power to the display;
   reducing power consumption in a video subsystem of the computer system, comprising the steps of:
      inactivating a pixel clock which drives a RAMDAC, thereby reducing power consumed by the RAMDAC; and
      decreasing the frequency of a memory clock for driving a video controller by a predetermined factor, thereby reducing the power consumed by the video controller.

2. The method of claim 1 wherein the video controller refreshes a frame buffer at a programmable rate and wherein said step of reducing power consumption in a video subsystem further comprises the step of increasing the programmed refresh rate in the video controller by said predetermined factor, such that the reduction in the memory clock frequency to the video controller is offset by the increase in the programmed refresh rate, resulting in the frame buffer being refreshed at a normal refresh rate.

3. The method of claim 1 wherein said step of inactivating the pixel clock comprises the step of programming a phase lock loop clock circuit to disable generation of the pixel clock signal responsive to a data word from the video controller.

4. The method of claim 1 wherein said step of decreasing the frequency of the memory clock comprises the step of programming a phase lock loop clock circuit to output a clock at a predetermined frequency responsive to a data word from the video controller.

5. The method of claim 1 wherein said step of reducing power consumption in a video subsystem further comprises the step of disabling a shift clock to a plurality of VRAMs forming a frame buffer.

6. The method of claim 1 wherein said step of decreasing the frequency of a memory clock to the video controller thereby reduces the frequency of memory cycles in a frame buffer, reducing the power consumed by the frame buffer.

7. The method of claim 1 wherein said step of generating signals to a display of a computer system to reduce power to the display comprises the step of generating signals from the video subsystem to enable operation of the display in one of a plurality of monitor power management modes.

8. The method of claim 7 wherein the signals from the video subsystem comprise the HSYNC and VSYNC signals output from the video subsystem and the plurality of monitor power management modes comprises the VESA monitor power management states.

9. A computer system for minimizing power consumption in a video subsystem comprising:
   a CPU connected to a system bus;
   a plurality of peripherals connected to said CPU by the system bus;
   a monitor; and
   a video subsystem connected to said monitor and connected to said CPU by the system bus, comprising:
      clock circuitry for programmably generating a first clock and a second clock, such that said first clock can be disabled responsive to a first control signal and said second clock can be reduced in frequency responsive to a second control signal;
      a frame buffer memory;
      a RAMDAC driven by said first clock coupled to said frame buffer, the power consumed by said RAMDAC dependent upon the frequency of said first clock;
      a video controller driven by said second clock and coupled to said frame buffer, said video controller controlling memory cycles in said frame buffer responsive to said second clock; and
      circuitry for inactivating said first clock and reducing the frequency of said second clock responsive to an indication of inactivity to reduce power consumption in said clock circuitry, said frame buffer and said RAMDAC.

10. The computer system of claim 9 wherein said video controller comprises circuitry for refreshing the frame buffer at selectable rates.

11. The computer system of claim 10 wherein the video subsystem further comprises circuitry for increasing the refresh rate of the frame buffer prior to reducing the frequency of said second clock.

12. The computer system of claim 9 wherein said video controller further comprises circuitry for communicating with said clock circuitry for setting said second clock to a desired frequency.

13. The computer system of claim 12 wherein said video controller further comprises circuitry for communicating with said clock circuitry for inactivating said first clock.

14. The computer system of claim 9 wherein said frame buffer memory comprises a plurality of VRAMs.

15. The computer system of claim 9 wherein said frame buffer memory comprises a plurality of DRAMs.

16. A method of managing power consumption in a computer system, comprising:
   monitoring a computer system for activity;
   performing power management in a video subsystem of the computer system in response detecting inactivity in the computer system, comprising the steps of:
      increasing the rate at which a video controller refreshes memory in a frame buffer by a predetermined factor; and decreasing the frequency of a memory clock for driving the video controller by the predetermined factor, thereby reducing the power consumed by the video controller and reducing the frequency of memory cycles to a frame buffer, while maintaining a normal refresh rate.

17. The method of claim 16 wherein the step of performing power management in a video subsystem further comprises the step of inactivating a pixel clock which drives a RAMDAC, thereby reducing power consumed by the RAMDAC.

18. The method of claim 17 wherein said step of inactivating the pixel clock comprises the step of programming a phase lock loop clock circuit to disable generation of the pixel clock signal responsive to a data word from the video controller.

19. The method of claim 16 wherein the step of performing power management in a video subsystem further comprises the step of inactivating a shift clock for driving the output of said frame buffer responsive to said step of inactivating the pixel clock.

20. The method of claim 16 wherein said step of decreasing the frequency of the memory clock comprises the step of programming a phase lock loop clock circuit to output a clock at a predetermined frequency responsive to a data word from the video controller.

21. The method of claim 16 wherein the step of monitoring the computer system for activity comprises the step of monitoring, by the basic input/output system of the computer system, the activity of a keyboard, a mouse, and a plurality of I/O ports of the computer system.

* * * * *